United States Patent
Campenon et al.

[11] Patent Number: 5,980,725
[45] Date of Patent: Nov. 9, 1999

[54] METHOD FOR UPGRADING WASTE MATERIAL COMPRISING SHEET METAL WITH A ZINC PLATING ON AT LEAST ONE SIDE THEREOF

[75] Inventors: Bernard Campenon, Saint Saulve, France; Johannes Greefkes, Beverwijk, Netherlands

[73] Assignee: Compagnie Europeenne de Dezingage, Saint SAulve, France

[21] Appl. No.: 09/000,489

[22] PCT Filed: Aug. 8, 1996

[86] PCT No.: PCT/FR96/01265

§ 371 Date: Apr. 6, 1998

§ 102(e) Date: Apr. 6, 1998

[87] PCT Pub. No.: WO97/06283

PCT Pub. Date: Feb. 20, 1997

[30] Foreign Application Priority Data

Aug. 9, 1995 [FR] France .................................. 95 09666

[51] Int. Cl.⁶ .............................. G25C 1/16; C21B 15/00; C23F 1/00
[52] U.S. Cl. ............................ 205/602; 205/717; 216/93; 75/715
[58] Field of Search ............................. 216/93; 205/602, 205/704, 717, 604; 75/715

[56] References Cited

U.S. PATENT DOCUMENTS

| | | | |
|---|---|---|---|
| 5,232,489 | 8/1993 | Mertens-Gottselig et al. | ........... 75/715 |
| 5,302,260 | 4/1994 | LeRoy et al. | ........................ 205/717 X |
| 5,302,261 | 4/1994 | LeRoy et al. | ........................... 205/717 |
| 5,330,558 | 7/1994 | McCormick et al. | .................... 75/715 |

*Primary Examiner*—Donald R. Valentine
*Attorney, Agent, or Firm*—Dennison, Meserole, Scheiner & Schultz

[57] ABSTRACT

Method for upgrading waste material comprising sheet metal with a zinc plating on at least one side thereof, including a) subjecting the waste material to a mechanical processing step to improve the accessibility of said zinc layers to a subsequent chemical etching by increasing the accessible etching surface of the zinc layer portions, this being achieved by crushing the waste material to separate the sheets from each other and by producing cracks in said zinc layers; this step is advantageously conducted in a shredder/mill; b) subjecting the waste material to a chemical etching step to dissolve the zinc by immersing it in a basic bath; and c) separating the zinc-free sheets from the chemical etching bath continuing the dissolved zinc, which is then recovered by electrolysis. The invention particularly discloses the use of the above method for recovering and upgrading fresh scraps of zinc plated sheets in the automotive industry.

13 Claims, 1 Drawing Sheet

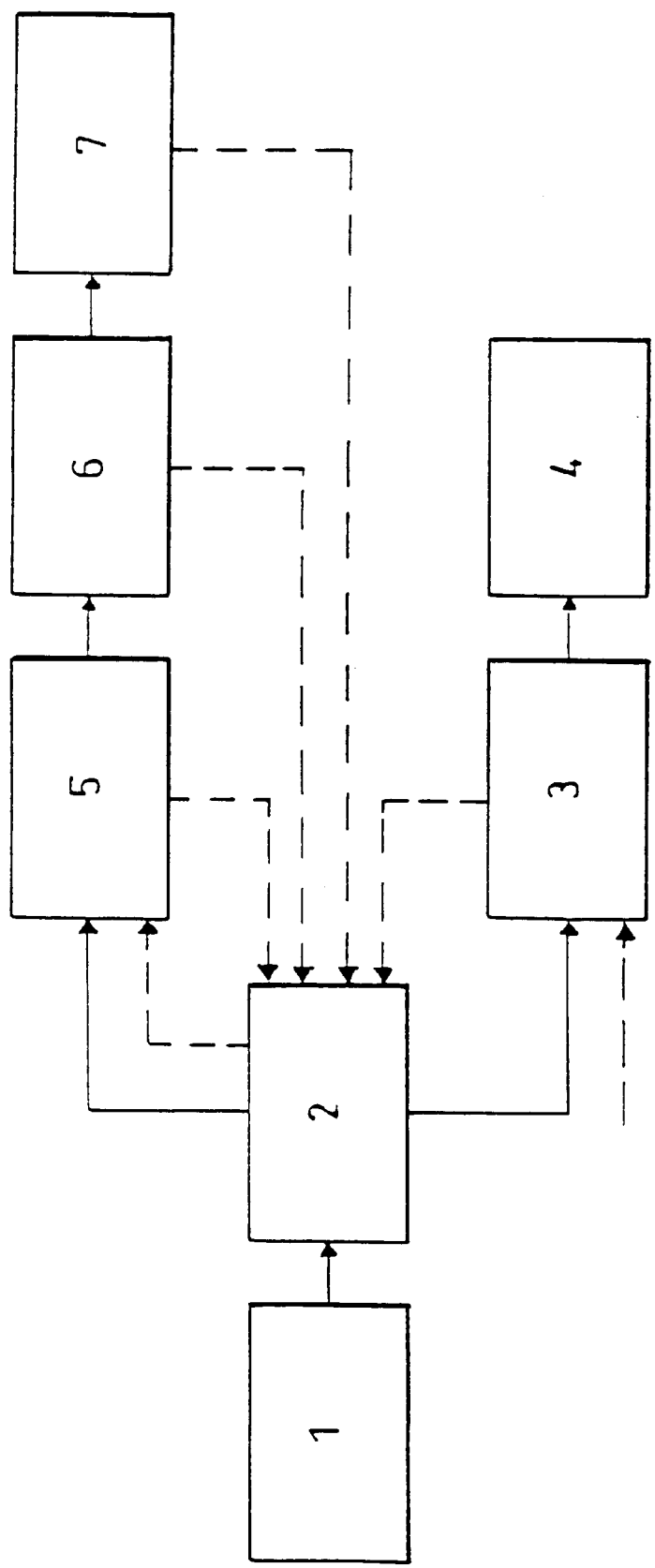

METHOD FOR UPGRADING WASTE MATERIAL COMPRISING SHEET METAL WITH A ZINC PLATING ON AT LEAST ONE SIDE THEREOF

BACKGROUND OF THE INVENTION

The present invention relates to a method of upgrading waste material comprising sheet metal with a zinc plating on at least one side thereof.

This sheet metal shall be referred to as zinc plated sheet metal in the present text.

The application of the present invention is most particularly found in the recovery and the upgrading of zinc plated sheet metal waste material produced by the automobile industry during the manufacture of the various pieces of cars consisting of said sheet metal, in particular during the operations of pressing and cutting out of said sheet metal.

Currently, the automobile industry consumes, for the manufacture of the bodywork and the doors of cars in particular, increasing amounts of pressing sheet metal plated with a zinc layer for protecting said sheet metal against corrosion.

The various operations during which the bodywork is manufactured from sheet metal necessarily lead to the production of relatively significant amounts of waste material known as "fresh scraps" from the automobile industry.

This waste material consists of fragments of zinc plated sheet metal of various sizes and having already optionally undergone a certain number of operations of pressing and cutting-out. These are therefore fragments of zinc plated sheet metal but which are in general far from being flat.

Furthermore, this waste material, given the medium and the conditions in which they are produced, are in general more or less soiled by traces of grease.

The method of the present invention is addressed to this type of waste material which is initially piled up more or less in bulk in workshops.

The presence of a relatively significant amount of zinc on the surface of the waste material prevents the direct recycling of this waste material in foundries or in steel works.

The re-use of the zinc plated sheet metal waste material does in fact pose various problems whatever the type of steel works in which recycling of these waste materials is tempted.

In a general manner, the zinc plated sheet metal used in the automobile industry in fact contains on average from 12 to 24 kilograms of zinc per tonne of sheet metal.

Melting down of the waste material cannot take place without causing various problems linked on the one hand to the respect of good conditions of hygiene and of security, and on the other hand to the resistance of the materials used to carry out this melting down.

More specifically, the presence of zinc makes it necessary:

to aspirate and treat the fumes, to control the concentration of zinc in the dust collected in the filters, to control the functioning of the filters under the conditions to which they are submitted, to capture the films, and this has certain difficulties, to prevent any problem of pulmonary and digestive irritation in persons working in melting workshops.

Furthermore, it is well known that the formation of a eutectic $ZnO/SiO_2$, the melting point of which is 1342° C. may be the origin of a degradation of the fireproofing materials constituting the lining of the furnaces in foundries.

Furthermore, it is also known that the presence of liquid zinc risks to harm the silica powder-based coatings very badly that are often found in centrifugation shells.

More specifically, three sorts of steel works are distinguished:

electric steel works, conversion steel works, induction furnace foundries.

The melting down of the zinc plated sheet metal waste material in electric steel works give rise to relatively few problems as regards the installations themselves.

The principal problem however finds itself at the level of the dust wherein the zinc is found concentrated, this necessitates a very costly treatment.

The melting down of zinc plated sheet metal scrap in induction furnace foundries itself also gives rise to problems related both to the fireproofing material and to the emission of fumes in the sites.

Hence, the automobile industry finds itself confronted with a grave problem of recycling of the waste material constituted of zinc plated sheet metal and this, whatever type of steel works or foundry for which the recycling of the waste material is envisaged.

SUMMARY OF THE INVENTION

The applicant, during his research has developed a method which not only allows solving the problems posed by the recycling of this waste material in a totally satisfactory way for the environment, but also which allows to totally upgrade the waste material by recovering both the sheet metal in a form which enables its re-use in foundries or in steel works, and the recovery of zinc in a perfectly pure state.

The method developed by the applicant can be applied most particularly to waste material of zinc plated sheet metal produced in the manufacture of automobiles, but it can also be applied to any waste material constituted of a steel sheet metal covered with a layer of zinc for the protection of said sheet metal against corrosion in particular.

Thus, according to one of its essential characteristics, the invention relates to a method of upgrading waste materials constituted of sheet metal covered with a zinc plating on at least one side thereof, consisting in subjecting said waste material to the following successive steps:

a) a first step referred to as mechanical processing step of said waste material to improve the accessibility of said zinc layers to a subsequent chemical etching, by increasing the accessible etching surface of the parts forming the zinc layers, on the one hand by carrying out the separation of said sheet metal from each other by the crushing of said waste material and, on the other, by creating cracks in said zinc layers, b) a second step referred to as chemical etching to dissolve the zinc, by the immersion of said waste material in a basic bath, c) a third step of separation of the zinc-free sheet metal from the chemical etching bath having dissolved the zinc.

DETAILED DESCRIPTION OF THE INVENTION

As has been seen previously, the waste material which is treated according to the present invention is in general waste material of very different forms which are piled up in bulk. It is mandatory for the reasons given above to remove the zinc as fully as possible before any attempt to melt the waste material. This is the reason why it is necessary to render the chemical etching as total as possible in a manner as to rid the waste materials at best of the layer of zinc which covers them.

This operation is rendered possible by the implementation of the first step of mechanical processing, the aim of which is to improve the accessibility of the zinc to the chemical etching. This first operation of mechanical processing consists in improving the separation of the sheet metal from each other so as to render the zinc layers more accessible to a chemical etching by a basic solution. This operation is carried out by bringing about a crushing operation to the waste material, the result of which is a physical separation of the sheet metals from each other. Furthermore, the accessibility of the zinc layer accessible by the chemical bath is improved by creating cracks in the zinc layers.

According to a first variant of the method of the invention, the two operations above which constitute the first step of the method are carried out simultaneously by using a shredder mill.

The waste material is then introduced into this shredder mill and this waste material is allowed to pass through grates of pre-determined size.

Thus, the new metal scraps are introduced into a shredder mill wherein, by virtue of a combined effect of impact and crushing, the pieces of metal are found shredded and compressed until they may pass through the openings in the grate.

After the pieces of shredded metal have passed through the openings of the grate, they are rejected and directed towards an outlet of the mill via a collecting hopper.

The waste material originating from this first grinding step are generally from 10 to 90 cm in size, advantageously in the order of 30 cm in size.

The waste material having undergone this first mechanical processing step is then immersed in a basic bath to dissolve the zinc layer covering this waste materials as fully as possible.

The basic bath is advantageously constituted of a sodium hydroxide solution.

The conditions under which the zinc is dissolved as completely as possible by the basic bath will be selected.

As an example, an immersion will be carried out with the staying time in the order of 30 to 60 minutes, advantageously in the order of 45 minutes, in a sodium hydroxide solution bath containing 9 to 11% of sodium hydroxide by weight, the bath being kept at a temperature between 79 and 86° C.

The conditions above are given as an example. These conditions do of course depend upon the composition of the waste materials, in particular the thickness of the zinc layer. The chemical etching conditions can be modified both as regards the composition of the basic bath and its temperature and the staying time of the waste material in the bath. Generally however, conditions shall be chosen such that there subsists, after chemical treatment, a zinc content of less than 100 ppm in the treated sheet metal waste material.

It has been found that the mechanical shearing forces to which the waste materials have been subjected, during the prior operations of grinding and pouring out before the introduction of the scrap metal in the basic etching bath, very markedly open up the zinc layer on the scrap metal, to such an extent that the basic bath can come into direct contact with the iron, which accelerates the dissolution process of the zinc in the dissolution reactor.

After the dissolution of the zinc, the scrap metal is removed from the dissolution reactor, advantageously continuously, and is directed towards a washing system to remove the traces of basic bath which can subsist on said scrap metal after the treatment to dissolve the zinc.

The oily impurities coming from the treated waste materials are found as an emulsion during the chemical etching.

The continuous removal of this emulsion during the chemical etching is carried out for example by continuously removing this emulsion via notches provided in the chemical etching reactor.

After the removal of the zinc by dissolution in the chemical bath, the scrap metal is recovered and is subjected to a washing operation, advantageously a counter-current washing, to fully remove the traces of base.

This washing operation is advantageously carried out in a perforated rotating washing drum. The use of such a device for the washing enables firstly recovering the liquid which runs out and to send it back towards the chemical etching reactor.

The sheet metal freed from the zinc which covers it is then submitted to a step of densification of the waste materials, so as to respect the specifications imposed by the type of foundry wherein it is desired to recycle the product.

This densification step is advantageously carried out by grinding the waste materials freed of their zinc layer. This step is advantageously carried out in a shredder mill and the densification is conventionally carried out by employing conditions such that the waste materials are forced through the holes of the grate of the grinder, so as to obtain the density desired.

According to a particularly interesting variant of the method of the invention, the zinc dissolved in the chemical etching bath is recovered in parallel after said etching. This recovery operation is carried out by electrolysis, and the washings of the scrap metal will optionally be added to the recovered chemical etching bath and will serve as electrolyte.

The conductivity of the electrolyte is adjusted continuously by the continuous measurement of its pH. The conductivity is regulated so as to be advantageously between 400 and 500 mmho/cm.

The zinc-free electrolyte can be continuously recycled, after re-heating, towards the zinc dissolution reactor.

Any electrolysis system can be used to carry out the process above which comprises at least one anode and one cathode, under the conditions wherein the zinc deposits on the cathode(s).

However, according to a particularly preferred variant of the invention and which allows rendering the complete process totally continuous, the zinc which is deposited on the cathodes of the electrolysis device is continuously detached during the electrolysis step.

This zinc removal step can be rendered possible by selecting cathodes of a particular nature which enable continuously removing the zinc deposited by bringing about vibrations to these cathodes.

A particularly suitable means consists in equipping the electrolysers with cathodes constituted of magnesium on which the zinc deposits in the form of a fine powder which does not form any dendrites. Thus, the zinc deposited sticks badly and may consequently be easily unstuck by simple vibrations brought about onto said cathodes.

The electrolyte containing the zinc hydroxide is sent continuously into the cells, e.g. cells of 4000 liters each, of a liquid bath electrolysis reactor.

The sodium hydroxide-based electrolyte containing the zinc is advantageously kept at a temperature in the order of 80 to 85°.

The liquid, which arrives in each of the electrolysis cells through a collection of plates which serve as cathodes and anodes, is submitted to an electrolysis process.

This enables depositing perfectly pure elementary zinc on the cathodes. The cathodes and the anodes act as conductors. The electrolyte acts as transport medium and as second conductor for the ions. The amount of zinc which sediments onto the plates serving as cathodes of course depends on the electrochemical equivalent, and may be calculated from the Faraday's general law. The thickness of the zinc layer obtained on the plates serving as cathodes of course depends upon the intensity of the electric current at this area of the plates.

The layers of zinc which deposit on the cathodes may be detached at regular intervals, in particular by forces of external mechanical vibrations.

The zinc thus detached descends in the form of a suspension by gravity towards an outlet of the cells of the electrolysis reactor.

The electrolyte which contains the zinc in suspension may therefore be continuously recovered. This suspension is then concentrated to recover the elementary zinc.

Furthermore, the electrolyte thus freed of zinc recovered at the cathodes may be recycled towards the zinc chemical dissolution reactor.

Hence, the method described above has the most particular advantage of being able to render totally continuous and to allow an almost total recycling of the reagents used, notably from the zinc dissolution bath.

The invention therefore provides a method which has the most particular advantage of being able to be carried out with almost no throwing away of products harmful to the environment.

The method of the invention can be applied most particularly to waste materials, known as fresh scraps of zinc plated sheet metal, in the automobile industry, this waste material being formed during the various operations of manufacture of automobiles from zinc plated sheet metal, in particular during pressing steps. It especially enables recovering from this waste material sheet metal referred to as zinc-free plated sheet metal which may be re-used in foundries, as well as elementary metallic zinc.

Thus, the method of the invention enables totally upgrading a directly non-usable waste material, by recovering its two essential constituents and which may thence be upgraded.

The method of the invention furthermore finds its application in the upgrading of any waste material of other sources, in particular constituted of sheet metal covered on at least one side with a zinc layer, in particular pressable sheet metal covered with a layer for protecting said sheet against corrosion.

As examples of other products to which the method of the invention can be applied, zinc plated sheet metal originating from various industries from which steel pieces or sheet metal pieces are produced may be cited which must be protected against corrosion, for example, pieces for vehicles of any type, metallic sidings and coatings, and metallic framework structures.

BRIEF DESCRIPTION OF THE DRAWINGS

FIG. 1 is a schematic flow diagram of the method according to the invention.

EXAMPLE

The following example refers to FIG. 1 in which the steps of the method are shown schematically as rectangles numbered from 1 to 7.

In this scheme, the circuits of the products are represented by full arrows, and the circuits of water are represented by discontinuous arrows.

In the installation represented schematically in the scheme of the figure, the fresh scraps coated with a layer of zinc and cutting oil originating from factories of French cars of deep pressing are treated according to the following steps:

Firstly, in step 1, a rough crushing of the sheet metal is carried out in a mill with articulated hammers mounted on axes and rotors. The mill is of power 920 kW. The first grinding is carried out by keeping the grinder door open. This first operation allows increasing the efficiency of the following chemical etching step by the creation of cracks in the layer of zinc and separation of the sheet metals eventually stuck together.

The crushed sheet metal originating from this first step 1 is then submitted to step 2 of chemical etching by plunging it in a caustic solution bath titrated at about 10%, at 85° C. and for 45 minutes. The zinc is then placed in a solution during this step and it is the sheet metal freed of its zinc coating which comes out at the other end of the chemical etching bath.

After this step 2, the products follow two different routes:

On the one hand, the zinc-free plated sheet metal is rinsed with counter-current in a step 3 carried out in a rotating riddle equipped with showers, for 15 minutes. Once rinsed, the zinc-free plated sheet metal is then ground a second time during a new grinding step 4 carried out in a grinder identical to that used in step 1. The grinding in this step 4 takes place under the same conditions as in step 1, with the exception that the grinding is carried out in this step with the door closed. The product recovered after this grinding step has a density close to 1.5.

From the 3000 tonnes of zinc plated sheet metal treated, about 2935 tonnes of zinc-free plated sheet metal are recovered from step 4.

on the other hand, the caustic solution containing zinc resulting from step 2 is submitted to an electrolysis step 5: it is more specifically sent into an electrolysis device constituted of 20 conical cells of 4000 liters each, which function 24 h/day and the conductivity of which is in the order of 450 mmho/cm. The cathodes of the cells are in magnesium. A difference in potential of 4.2 V is kept between the anodes and the cathodes. Under these conditions, the zinc deposits in the form of a fine powder on the cathodes and may be unstuck by simple vibrations brought about through these cathodes and comes to deposit at the bottom of the electrolysis cells.

The metallic zinc recovered during this step is then submitted to a step 6 of decanting/separation, and then to a step 7 of conditioning wherein it is placed in the form of thick disks of about 25 over 15 cm.

65 tonnes of zinc are thus recovered from 3000 tonnes of zinc plated sheet metal treated.

A most particular advantage of the installation described in this example is that it works without rejecting water to the exterior of the installation, and all the water introduced is re-used during the process.

We claim:

1. A method for upgrading waste material comprising sheet metal coated with a zinc plating on at least one side thereof, comprising the steps of:
   a) mechanically processing said waste material by crushing said waste material and creating cracks in said zinc plating, thereby improving the accessibility of said zinc plating to subsequent chemical etching by increasing accessible etching surface of the waste material;
   b) chemically etching the mechanically processed waste material to dissolve the zinc, by the immersion of said waste material in a basic bath; and
   c) separating the chemically etched waste material from which zinc has been dissolved from the bath having zinc dissolved therein.

2. The method according to claim 1, wherein said step of mechanically processing is carried out in a shredder mill, by causing said waste material to pass through grates of predetermined size.

3. The method according to claim 1, wherein said step of chemically etching is carried out by immersing said waste material in a bath comprising sodium hydroxide solution.

4. The method according to claim 1, additionally comprising subjecting the separated waste material to a washing step to totally remove traces of the basic bath.

5. The method according to claim 4, wherein the washing step is carried out by the introducing said separated waste material in a perforated rotary cleaning drum.

6. The method according to claim 1, additionally comprising subjecting the separated waste material to a densification step.

7. The method according to claim 6, wherein said densification step is carried out by grinding said separated waste material.

8. The method according to claim 1, additionally comprising recovering the bath in which zinc has been dissolved by electrolysis, the dissolved zinc being deposited at a cathode of the electrolysis.

9. The method according to claim 8, wherein the zinc deposited on the cathode is continuously removed from the cathode.

10. The method according to claim 9, wherein the cathode comprises magnesium, and the deposited zinc is removed continuously by vibrating the cathode.

11. The method according to claim 9, wherein the zinc is continuously removed from the cathode into a suspension in the bath being recovered, the bath is continuously removed from the electrolysis, and the removed suspension is concentrated to recover the zinc.

12. Method according to claim 1, wherein the waste material comprises fresh scraps of zinc-plated sheet metal from automobile manufacturing, the method thereby recovering zinc-free sheet metal, and/or elementary metallic zinc.

13. Method according to claim 1, for upgrading a waste material comprising steel sheet metal plated on at least one side with a layer of zinc to protect the steel from corrosion.

* * * * *